United States Patent [19]

McBride

[11] 3,949,109

[45] Apr. 6, 1976

[54] SUPPORT STRUCTURES FOR FIXED BED FLOW REACTORS

[75] Inventor: John Joseph McBride, Wilmington, Del.

[73] Assignee: E. I. Du Pont de Nemours and Company, Wilmington, Del.

[22] Filed: July 26, 1974

[21] Appl. No.: 492,228

Related U.S. Application Data

[63] Continuation-in-part of Ser. No. 367,725, June 7, 1973, abandoned, which is a continuation-in-part of Ser. No. 351,591, April 16, 1973, abandoned.

[52] U.S. Cl. ............... 428/36; 428/109; 428/114; 428/135; 428/210; 428/268; 428/273; 428/294; 428/302; 428/317; 428/325; 428/378; 428/399; 23/288 F; 427/374; 427/380
[51] Int. Cl.² .................. B01J 8/02; B32B 5/12
[58] Field of Search ........... 161/57, 59, 60, 78, 93, 161/109, 139, 143, 175, 176, 179, 180, 193; 117/125, 126 GF, 169 A; 23/288 F; 428/36, 107, 109, 110, 114, 135, 210, 268, 273, 294, 317, 325, 378, 359

[56] References Cited
UNITED STATES PATENTS

| | | | |
|---|---|---|---|
| 2,664,375 | 12/1953 | Slayter | 154/93 |
| 3,189,563 | 6/1965 | Havel | 252/460 |
| 3,450,546 | 6/1969 | Stong | 106/39 |
| 3,713,854 | 1/1973 | Beall | 106/39 DV |
| 3,849,181 | 11/1974 | Green | 117/169 A |

FOREIGN PATENTS OR APPLICATIONS 619,893   5/1961   Canada

Primary Examiner—George F. Lesmes
Assistant Examiner—William R. Dixon, Jr.

[57] ABSTRACT

A catalyst support is described for use in fixed bed flow reactors. The support is a porous, self-supporting structure of multiple layers of a yarn of partially sintered glass-ceramic fibers. The structure has diamond shaped apertures in its walls to provide good fluid permeability. Preferably, it is tubular. Coated with a catalyst, the structures are especially adapted for use in the catalytic conversion of pollutants in the exhaust fumes of internal combustion engines.

13 Claims, 6 Drawing Figures

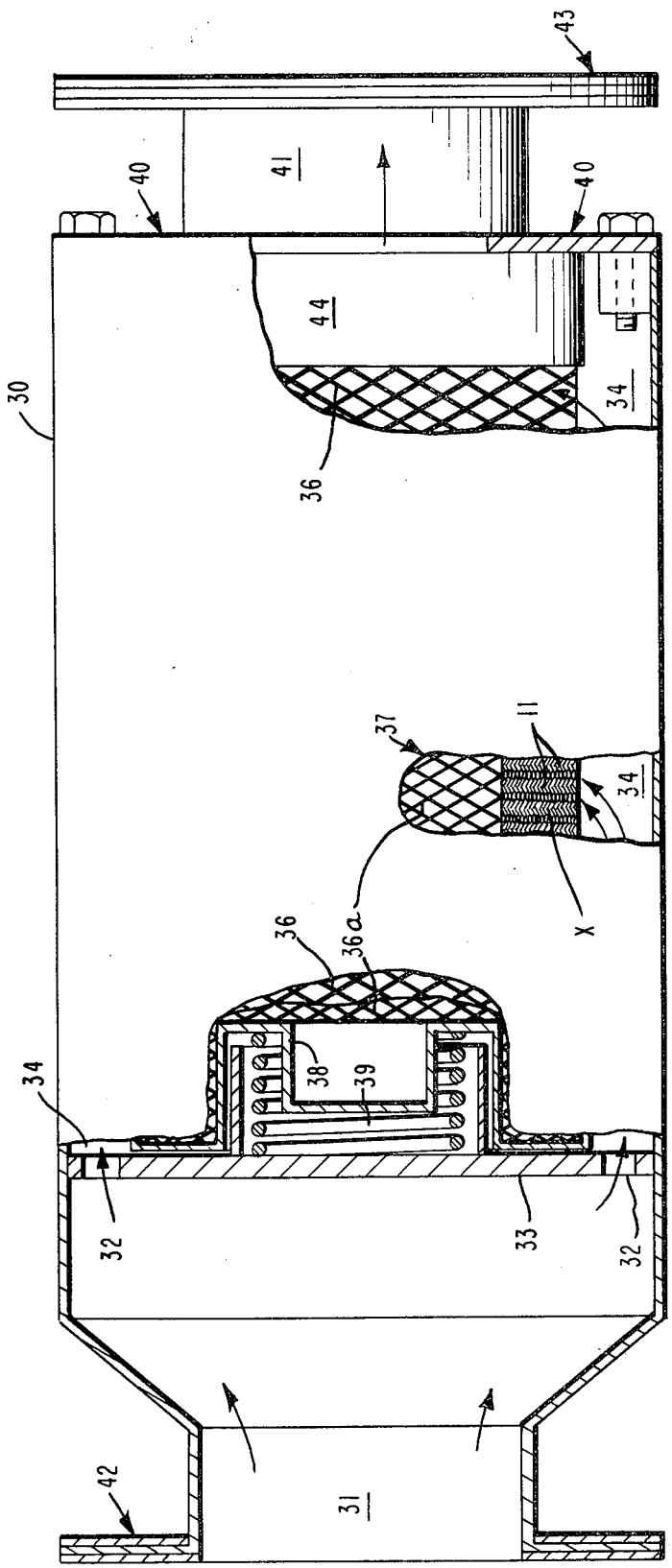

SUPPORT STRUCTURES FOR FIXED BED FLOW REACTORS

CROSS REFERENCES TO RELATED APPLICATIONS

This application is a continuation-in-part of my copending application Ser. No. 367,725 filed June 7, 1973 now abandoned, which in turn is a continuation-in-part of application Ser. No. 351,591, filed Apr. 16, 1973, now abandoned.

BACKGROUND OF THE INVENTION

This invention relates to support structures for use in fixed bed flow reactors. More particularly, the invention is directed to a glass-ceramic fiber-containing structure in the form of a catalyst support useful in the conversion of internal combustion engine exhaust fumes.

In recent years, the control of pollutants in the air has become of general concern. The catalytic conversion of pollutants in the fumes from the exhausts of internal combustion engines is one area being explored. However, progress in this area has been hindered by the lack of a satisfactory support for the catalyst employed, which support, in many applications, such as in motor vehicles, is subjected to continual stress due to both mechanical shock received while the vehicle is in motion and thermal shock from variations in exhaust temperatures.

Ordinarily, a support which maximizes contact between the exhaust gases and the catalyst must be an open one, i.e., one with holes or openings to permit "flowthrough" of the gas while it contacts a catalyst coating. Such holes or openings lower the strength and the durability of known structures. Thus, a need exists for a strong, durable support for such catalysts that is also constructed to maximize exposure of the catalyst surface to the exhaust gases.

SUMMARY OF THE INVENTION

The present invention involves both an article of manufacure and a process for its production.

The article of manufacture is a porous, fluid-permeable, thermally shock resistant, durable, self-supporting, refractory structure of yarn arranged in crisscrossed layers which present through apertures. In the finished article, the yarn is a composite of glass-ceramic fibers at least partially surrounded by a ceramic coating of a polycrystalline refractory oxide and/or oxide compound and the fibers are partially sintered. In a preferred embodiment, the structure is tubular and contains a reaction interface between the fibers and the ceramic coating consisting of a polycrystalline refractory silicate.

The crystalline phases present in the glass-ceramic fibers and constituting the coating and any interface are stable and have melting points of at least 1400°C., ranging up to 2800°C. A stable crystalline phase is defined as a phase having a crystallographic structure (at room temperature) that remains constant after heating to 1400°C. and cooling.

The refractory structure is prepared by applying a coating composition to a yarn of crystallizable glass fibers and then arranging the yarn in the desired, crisscrossed layers. Next, the structure is heated to remove volatiles from the coating composition. Optional applications of coating composition and heating steps follow until the desired level of coating is obtained (not less than 15% nor more than 80% by weight of the final article). Then, in a significant aspect of the process, the structure is heated to a high enough temperature to successively mature the coating composition and thereby provide structural integrity, convert the glass fibers to glass-ceramic fibers (at least 60% crystalline), and provide the driving force for reactions between the glass-ceramic fibers and the ceramic coating. Finally, the structure is cooled at a rate which avoids structural weakening due to thermal shock.

In its preferred embodiment, the structure is formed by winding yarn of crystallizable glass fibers in crisscrossed layers of spaced, helical convolutions to present a tube having rows of diamond shaped apertures extending through its wall.

By the term "refractory" is meant that the structure may be used at temperatures in excess of 1200°C. The structures will have a creep failure temperature above 1200°C. and, preferably, a creep failure temperature of at least 1400°C., ranging up to 1600°C.

Where used herein, the term "glass-ceramic" is descriptive of glass fibers which have been heated under controlled conditions to provide at least 60% crystallization, i.e., to yield fibers containing at least 60% stable crystalline phases.

By the expression "partially sintered" is meant that the major portion of the composite yarn consists of fibers sintered directly to one or more fibers or sintered through a ceramic coating (including any reaction interface) and optionally some single fibers (with or without a coating), the extent of sintering being less than complete so that, as viewed in cross section, there are substantially uniformly distributed, closely-spaced voids (i.e., channels in a longitudinal section) of from 1 to 50 $\mu$ equivalent diameter (but typically 5–20 $\mu$) present. The distances between neighboring voids are typically less than 10% of the composite yarn thickness (generally from 1 to 5%). A minor portion of the yarn (preferably less than 20%) can consist of one or more agglomerates (called "fused areas") of fibers and ceramic coating with an area greater than 2% of the composite yarn cross section containing no voids. By "equivalent diameter" is meant the diameter of a circle having the same area as the void.

In contrast to the porous microstructure of the above yarns, the improper choice of materials and/or processing conditions can cause complete sintering to yield a yarn consisting of a single fused area (in cross section). Yarns in the structures of the present invention will have porosities of between 10 and 70%. Those porosities are caused by channels between sintered fibers as seen in longitudinal micrographs of the yarns. Such channels have length to width ratios of between about 1:1 and 40:1.

DESCRIPTION OF THE DRAWINGS

FIG. 5 is a longitudinal view through a catalytic converter which includes a tubular catalyst support made in accordance with the present invention, parts having been broken away and shown in section to reveal details of arrangement and construction.

FIG. 5A is a fragmentary enlargement of the sectioned zone identified at X in FIG. 5.

DESCRIPTION OF THE INVENTION

Figure 1:
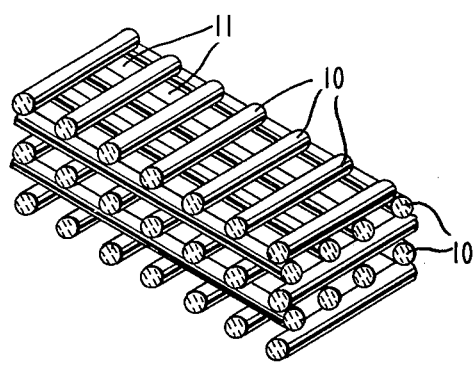
FIG. 1 is an enlarged, fragmentary, perspective view of a self-supporting structure made in accordance with the present invention.
Figure 2:
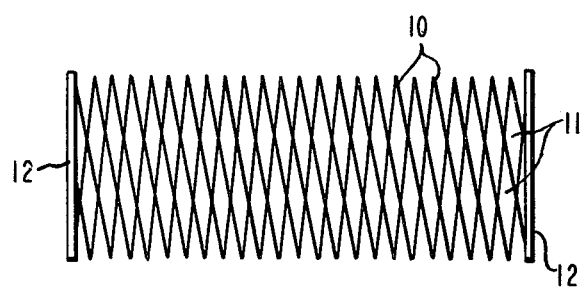
FIG. 2 is a schematic illustration of the manner in which yarns in successive layers are crisscrossed.

The structure shown in FIG. 1 has crisscrossed layers of yarn 10 arranged in successive layers to present rows of diamond shaped apertures 11. The lengths of yarn in each layer are substantially parallel and each length is also substantially parallel to and in registry with corresponding lengths of yarn in alternate layers. Thus, apertures 11 extend through the thickness of the matted structure. In FIG. 2, an optional protective coating 12 of the type described in Example 3 has been shown at the ends of the structure.

Figure 3:
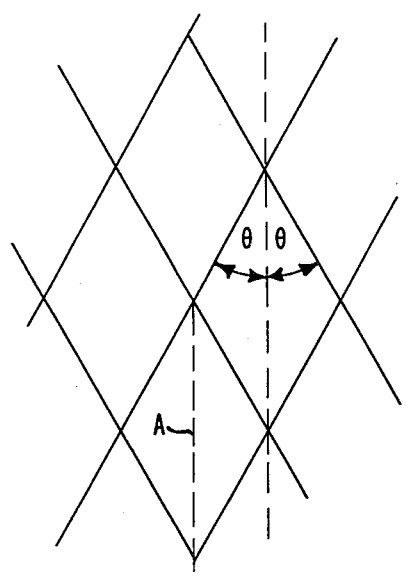
FIG. 3 is a fragmentary enlargement of the arrangement illustrated in FIG. 2.

In FIG. 3, the winding angle $\theta$ used to prepare the preferred tubular structure has been shown and the long dimension of apertures 11 has been designated A. Further and more detailed reference is made to these illustrations in ensuing descriptions of the process for preparing a tubular structure.

Figure 4:
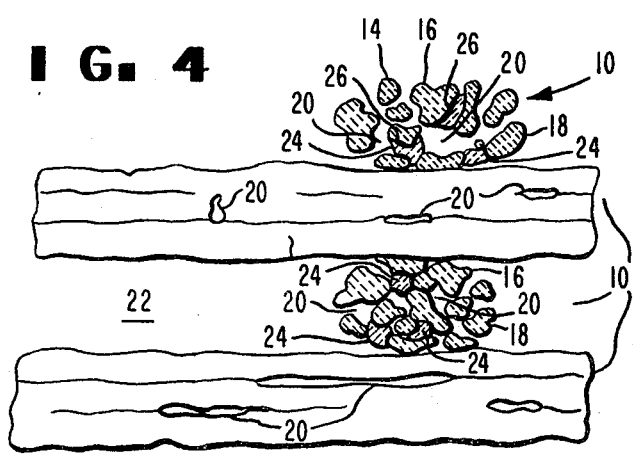
FIG. 4 is an imaginary, fragmentary, sectional view through a structure of the type shown in FIG. 1.

The illustration in FIG. 4 is not intended to be an accurate or exact depiction of any particular structure but is based on microscopic observations of several fractured structures and accordingly is only schematically representative. As such, it shows four layers of yarn. In the two sectioned layers, the partially sintered yarn 10 is shown to include single fibers 14, groups 16 of three sintered fibers, groups 18 of two sintered fibers and channels or voids 20. The open passages between corresponding yarns 10 in alternate layers have been identified at 22. Disproportional illustrations of ceramic coating and or coating/fiber reaction interfaces are identified at 24 and 26, respectively.

An examle of the use of the integral structure of this invention in the form of a tube used as a catalyst support or carrier is shown by FIG. 5 where a reactor for converting exhaust fume pollutants includes an open-ended container having a cylindrical wall 30. Exhaust gas enters chamber 31, passes through holes or perforations 32 in wall 33 to annulus chamber 34 and thence through apertures 11 in the refractory tube 36 of this invention to the central space 37, and exits through chamber 41. As shown at 36a, apertures 11 have slightly smaller dimensions at the interior of tube 36. The tube is held by movable brackets 38 and 44 and pushed by spring 39 into end plate 40. Mounting plates 42 and 43 are provided for attaching the reactor in an exhaust system. Optionally, the exhaust can enter at 41 and exit at chamber 31.

Selection of Glass Fibers

Suitable glass fibers are those siliceous glass (ca. 40 to 80% $SiO_2$, preferably 55 to 70%) fibers with a diameter of from about 5 to 50 microns which can be heated to yield fibers containing at least 60% of one or more stable crystalline phases, such phases having melting points of at least 1400°C. Preferably, the glass fibers will contain, in addition to $SiO_2$, at least 30% of refractory oxides such as $Al_2O_3$ and MgO.

The glass fibers are used in the form of yarns, preferably continuous filament yarns, although yarns containing staple fibers can also be used.

The preparation and conversion of nucleated glass to crystalline glass-ceramic materials is well known, as shown by "Glass-Ceramics" by P. W. McMillan, published by Academic Press of New York, 1964. Suitable crystallizable glasses for making fibers for use herein can be found in the $Li_2O$—$Al_2O_3$—$SiO_2$, BaO—$Al_2O_3$—$SiO_2$ and MgO—$Al_2O_3$—$SiO_2$ systems which contain a nucleation catalyst such as 2–20% by weight $TiO_2$, 0.5–6% by weight $P_2O_5$ or a metal phosphate, as well as others mentioned by P. W. McMillan, op. cit.

I have found that some nonnucleated glasses can be used. An example of a nonnucleated crystallizable glass fiber is S-glass ("Fiberglas S" made by Owens-Corning Fiberglas Corp., Toledo, Ohio) which has a nominal composition of 64–66% $SiO_2$, 24–26% $Al_2O_3$ and 9–11% MgO.

Table A presents the heat treatments needed to crystallize S-glass fiber alone (A) and in a composite (B) of S-glass fiber yarn with a coating of alumina (a wound tube with the alternative coating of Example 6). Each of the S-glass samples alone and with alumina was heated in a kiln to the given temperature and held at that temperature for 60 minutes, except that the 1400°C. items was heated in a tunnel kiln to a maximum temperature of 1400°C., using the 10-hour heating-cooling cycle of Example 5. Crystalline phases were determined from X-ray diffractometer scans. Phases identified include alpha cordierite ($2MgO.2Al_2O_3.5SiO_2$), cristobalite ($SiO_2$), mullite ($3Al_2O_3.2SiO_2$) and alpha alumina.

All heated samples of the composite (B) contained $\alpha$-alumina and the 1400°C. heating of the composite yielded 17% mullite from the reaction of alumina from the coating and silica from the fiber. The extent of crystallization of the fibers in the composite can be estimated by dividing the sum of (a) the crystalline phases from the glass (i.e., $\alpha$-cordierite and cristobalite) plus (b) the amount of silica present in the mullite by the weight fraction of glass (0.52) in the starting composite. Thus the fibers in the composites were crystallized 19%, 88% and 99+% for the 1200, 1300 and 1400°C. firings, respectively. The presence of the alumina coating apparently inhibited the crystallization of the glass at 1200° and 1300°C.

The original (unheated) S-glass fibers have a softening temperature of 900°C. S-glass fibers that have been heated (supported) to 1200°C. and then held at 1200°C. for 1 hour have a softening temperature above 1350°C. and below 1400°C.

An example of a glass fiber that does not crystallize and is not suitable is E-glass ("Fiberglas E" by Owens-Corning Fiberglass Corp. of Toledo, Ohio) having a nominal composition of 52–56% $SiO_2$, 16–25% CaO, 12–16% $Al_2O_3$, 8–13% $B_2O_3$, 0–6% MgO, 0–1% $Na_2O$ and $K_2O$. E-glass fibers have a softening temperature between 700° and 800°C. Even after heating to 1400°C. and cooling over a 14-hour period, the glass (completely fused) is still completely amorphous.

TABLE A

| Temperature of heating °C. | % $\alpha$ - Cordierite - % Cristobalite | |
|---|---|---|
| | (A) S-Glass | (B) S-Glass/Alumina |
| 900 | 0–0 | 0–0 |
| 1000 | 0–0 | 0–0 |
| 1100 | 4–1 | 0–0 |
| 1200 | 41–27 | 0–10 |
| 1300 | 69–31 | 5–41 |
| 1400 | 65–32 | 44–8 |

Coating Composition

The coating composition is a fluid which contains particles of one or more oxides or oxide compounds having melting points of at least 1400°C., a precursor of such an oxide or oxide compound or both. The composition is converted by heating at a relatively low temperature (e.g., 700°C.) to a refractory oxide, a mixture of oxides and/or oxide compounds (e.g., mullite) and then constitutes the "ceramic coating" referred to herein. There is from 15–80% by weight of ceramic coating, preferably 30–60%, in or on the finished article.

Alumina is a preferred refractory oxide. Suitable precursors include alumina hydrates and basic aluminum chloroacetate. The composition can contain both refractory oxide particles and a precursor, preferably both.

As noted, the ceramic coating must have a melting point of at least 1400°C. Preferably, this will be at least 1600°C. and can be as high as 2800°C. or more.

The coating composition must yield a solid coating, at a relatively low temperature, that has sufficient strength to act as the structural foundation for maintaining configurational integrity of the article during thermal treatment up to and through the softening point of the crystallizable glass. Without such a coating, structural integrity is not maintained.

The composition of the coating must be such as to avoid fluxing of the total composition, i.e., the coating plus crystallizable glass cannot be a composition such that a phase is created that melts lower than the firing temperatures or use temperatures.

Preferably, the phases present in the finished article resulting from the ceramic coating and the glass fibers should not be phases that undergo displacive transformations within the range of the expected use temperature of the product. For example, crystallization of S-glass can yield cristobalite. Excess cristobalite is undesirable since it undergoes a displacive transformation at 200° to 270°C. with an associated volume change which contributes to poor thermal shock resistance. The finished articles should contain no more than 30% cristobalite by weight and preferably from 0% to 15%.

A coating should preferably be used that can react with the excess silica to yield a thermally stable phase, e.g., alumina reacts with silica under appropriate heat treatment conditions to yield mullite (72% $Al_2O_3$, 28% $SiO_2$). It is surprising such a reaction between the ceramic coating and the glass fiber can occur without complete loss of the fiber integrity. It is believed that, under the conditions used, the silica diffuses to the surface of the fiber to react with an oxide, e.g., alumina, in contact with the fiber. Thus, an interfacial reaction zone is created where the coating composition has contacted fibers. The reaction product is crystalline and should also have a melting point of at least 1400°C.

Combinations of alumina and alumina precursors are particularly desirable and give finished articles with high compressive and impact strength. A useful coating composition contains about 25% of very small particles of alpha alumina and about 35% of water soluble aluminum chlorohydroxide (converts to $Al_2O_3$ equivalent to about 17% of the coating composition) in water. The viscosity of this composition can be varied widely by its preparation and the amount of water present. Viscosities in the range of 40–200 centipoises have proved useful.

Preferably, the ceramic coating should contain at least 40% by weight of alumina with the other oxides being selected from those of the metals of Group IIA and Group IVB of the Periodic Table such as BaO, CaO, MgO, $ZrO_2$ and $TiO_2$. The oxides (or their precursors) may be present in the coating composition as simple, single oxides (Example 4h) or as an oxide compound such as spinel (71.6% $Al_2O_3$, 28.4% MgO), Example 4f.

The limits on the ceramic coating of 15 to 80% of the total weight of the product are based on operability. The use of less than 15% coating leads to excessive sintering of the fibers and often to deformation of the product during high temperature processing (e.g., 1400°C.). The use of more than 80% coating tends to fill the apertures (and increase the pressure drop excessively) and to yield poor adherence of the final coats to the structure.

Preferably, 60–90% of the ceramic coating is derived from particles of the oxides in the coating composition and 10–40% is derived from a precursor.

Coating Application

Preferably, the coating composition is uniformly distributed around the fibers of the yarn. This affords the highest thermal shock resistance in the fired product for a given composition due to the completeness of the coating-fiber reaction. The distribution is affected by the viscosity of the coating composition, the method of application, the density (or tightness of the yarn bundle), the nature of the yarn and the amount of the coating composition. The composition should have a viscosity that is low enough to permit flow and some penetration into voids in the yarn but high enough to facilitate adhesion to the yarn structure. Solid particles present in the coating composition should be preferably less than about 20 microns in diameter (and, more preferably, less than 2 microns) to aid penetration into voids between fibers in the yarn. Fine particle size promotes reactivity with the fiber.

Preferably, the coating composition is applied in an amount calculated as ceramic coating of 20–50% by weight of the final structure to the crystallizable siliceous glass fiber yarn before the yarn is arranged in layers, as described hereinbelow, to provide uniform distribution of the coating. The coating composition can also be applied, if desired, after the layers of yarn are obtained.

The coating compositions which are conveniently aqueous dispersions or solutions can be applied to the yarn in many ways such as immersion of the yarn in a bath, use of a finish roll, spraying, etc. The use of a stripper die on a wet-coated yarn has proven to be useful for yielding good distribution of the coating composition and controlling the coating level.

The yarns of continuous glass fibers may consist of singles yarn (i.e., one group of the filaments) or plied yarn of two or more singles yarns and will generally have some amount of twist or interlacing to permit handling the yarn. However, as the density of the yarn is increased by a higher twist level or greater interlacing, it becomes more difficult for the coating composition to uniformly penetrate the yarn. Bulked and textured yarns may be used (Example 7).

To arrange the layers of crystallizable glass fiber yarn, the yarn can be laid out in spaced, substantially parallel rows, alternating the direction of laydown as the layers are built up so as to obtain the desired crisscross pattern having the diamond shaped apertures. The term "diamond shaped" as used herein includes square shapes. This procedure produces a matted structure and will be referred to hereinafter as a mat.

More conveniently, however, one or more ends of yarn of the crystallizable glass fibers, with or without twist, are wound in a crisscross fashion on a core, tube or bobbin of the desired shape. The phrases "tubular core" and "tube of yarn" are meant to include shapes that have a continuously hollow center and have cross sections perpendicular to the tube axis which may be circular, or noncircular, e.g., ellipses, squares, triangles and the like which may be tapered. The winding is conveniently carried out with a conventional yarn windup machine having a constant ratio of traverse speed and bobbin angular velocity which gives a reproducible, uniform laydown of the diamond shaped apertures. The Leesona T-959 windup is suitable.

A typical winding procedure would start at the left-hand edge of a bobbin at a given winding angle, $\theta$. The yarn will make an angle with a plane normal to the tube axis of $(180° - \theta)$ as measured clockwise. The second layer of yarn is wound from right to left and makes the angle $\theta$ with the above plane as measured clockwise. This affords a diamond shaped configuration (ideally a rhombus) with an inside angle of $2\theta$ bisected by diagonal A of FIG. 3 which runs in the plane normal to the tube axis around the tube circumference. The size and shape of the diamonds formed by the intersection of the yarns is defined by the winding angle, $\theta$, and by diagonal A.

Winding angles of from 3° to 52° (preferably, 25° to 35°) and diagonal A's of from 0.05 to 0.8 inch (preferably 0.1 to 0.3 inch) are used. Preferably, the distance between successive, parallel yarns forming opposite sides of the diamond is at least 0.05 inch. These parameters are calculated for the inside surface of the tube.

For some patterns, it may be necessary to wind two or more layers at a given A value and $\theta$ forming the diamond. In such cases, the diamonds will be formed from nonadjacent yarn layers.

The registration of the diamond shaped apertures on successive layers of yarn can be controlled to give passageways that are approximately radial or passageways that follow a curved path from the inside out.

In addition to winding to form uniform patterns, mixtures of two or more different size apertures can be provided by appropriate modification of the winding. The wound tube can be cut to give a mat.

Firing

The tube or mat bearing coating composition is dried and heated. During this heat or firing treatment, the coating composition present on the crystallizable glass fiber yarn is set. Typical coating compositions will require temperatures of between about 350° to 800°C. to remove most volatiles and to develop crystallinity and strength in the coating. This heating converts precursors in the coating composition to the oxides (e.g., alumina). Under some circumstances, e.g., high precursor level in the coating composition, the firing process may produce small cracks in the ceramic coating due to shrinkage. These are preferably "healed" by applying one or more additional applications of the coating composition to the tube, with drying and moderate firing between coats. Such additional applications increase the resistance of the tube to sagging or distortion during high-temperature firing, especially when they are fired unsupported in a vertical position.

The structures consisting of glass yarns coated with ceramic coating are then heated at higher temperatures to develop crystalline phases in the glass fibers and to cause reactions between the fibers and the ceramic coating. This heating can be cotinuous with the previous moderate heating.

The presence of the crystalline phases provides the good stability under load of the structures. In order to achieve the crystalline phases necessary to the fibers in the yarns used herein, the structure is heated to crystallization temperature, and held at about the crystallization temperature to develop crystallinity in the fibers, usually between about 1200°C. and 1400°C., but it will be understood that if a nucleated glass is used, the crystallization rate at lower temperatures may be practical. Usually, between ¼ and 24 hours of heating are needed to obtain the desired degree of crystallinity. Heating to higher temperatures generally reduces the time required to develop the desired crystallinity. For any system, there is a maximum heating temperature beyond which the tube will distort under its own weight. For example, this temperature is in the vicinity of 1450°C. (for about a 0.5 hour hold) for tubes containing S-glass fibers and alumina.

The heating must occur slowly enough to permit setting of the coating composition before the softening temperature of the crystallizable glass is reached in order to prevent the structure from sagging and deforming. Thus, the final structure obtained after heating, or firing, is one in which the fibers of the yarn have been fired to glass-ceramic fibers that are partly crystalline and partly sintered together. The crystalline phases in the glass-ceramic fibers will constitute between 60 and 100% of the fibers of the yarn by weight; preferably, however, the crystalline phases will constitute at least 90% by weight.

After completion of the crystallization heating or firing, the structures are cooled slowly to avoid thermal shock. Heating rates and crystallization temperatures for a number of crystallizable glasses can be determined by measurements on models, as described by P. W. McMillan, "Glass-Ceramics", Academic Press of New York, 1964, Process Summary A preferred process uses a yarn of siliceous glass fibers comprising 61–66% $SiO_2$, 20–26% $Al_2O_3$ and 9–15% MgO. A coating composition consisting essentially of alumina and an alumina precursor is applied to the yarn (in an amount to give ceramic coating equivalent to 27–34% of the weight of the final tube) before the yarn is wound to the tube. The wound tube is dried at 150°C., heated to about 600°C., held for 45 minutes and cooled. Additional alumina coating composition is applied in an amount to give ceramic coating equivalent to 9–12% of the weight of the final tube and the tube dried at 150°C. The dried tube is high fired to about 1350°–1440°C. in a period of 2.5 to 8 hours, held at the maximum temperature for ¼ to 24 hours and cooled. More preferably, all of the coating composition is applied before the tube is wound to give the final tube containing 36–46% weight of a ceramic coating.

Optionally, additional coating composition can be added to the above high-fired tube in an amount to give ceramic coating equivalent to 5–25% of the ultimate tube and the tube heated at a moderate temperature (ca. 900°C.) to provide a good substrate for a catalyst (e.g., Example 5).

The Finished Article

The glass-ceramic yarns in the fired structures will generally have a flattened shape as shown in FIG. 4. The ratio of the maximum to minimum dimension in a cross section perpendicular to the length of the yarn will range from about 1:1 to about 15:1.

The fired structure retains the openings present in the unfired structure, i.e., the diamond shaped apertures 11 and most of the inter-yarn passages 22. These, plus the channels 20 provide a fluid permeable structure that permits flow-through of fluids, particularly gases. The fired structure derives its high temperature strength and integrity from the crystalline portions of the fibers, the ceramic coating and from yarn to yarn bonds which are due to ceramic coating, coating-fibers interface, sintered fibers or a combination.

The fired structure may be coated with a catalyst, and thus used as a catalyst substrate or carrier. Suitable catalysts include the precious metals (Ru, Rh, Pd, Os, Ir and Pt) in elemental or oxide form and oxides, vanadates, chromates, chromites, manganates, manganites, stannates, molybdates, tungstates, niobates or tantalates of Fe, Co Ni, Cr, Mn, Cu, Zn, Ag and Cd and the rare earth salts. These catalysts may be coated onto the structures by absorption of a suitable compound containing the active catalytic component or imbibition of the active component or precursor thereof from a slurry form followed by drying and conversion to the active component. It may be desirable to coat the structure with a suitably inert high surface area refractory material before adding catalyst. Ordinarily, the catalytic activity involves the oxidation of carbon monoxide, hydrocarbons and/or hydrocarbon residues, or the reduction of nitrogen oxides. A fired structure derived from original components contaning a catalyst may exhibit catalytic activity in converting exhaust fume pollutants to harmless compounds.

The preferred products of the invention have a compressive strength of at least 30 psi (more preferably, at least 100 psi), a creep failure temperature measured under a compressive force of at least 4 psi above 1200°C. (more preferably at least 1400°C.), a pressure drop of between about 1 and 100 inches of water and more preferably less than 20 inches. The preferred products of the invention have a thermal shock resistance such that they retain a compressive strength of at least 30 psi (and as high as 300 psi) after 5 cycles of: placing a cold unit in an oven at 950°C., heating for 5 minutes, removing from the oven and cooling in room temperature air for 5 minutes.

Test Procedures

The softening temperature of a yarn is obtained by placing a two-inch length of yarn across the sides of an alumina boat of about one-inch width so that about equal lengths extend beyond both sides, heating the boat and fiber in a furnace and raising the temperature by 100°C. increments until the yarn sags at either end or in the middle.

Crystalline phases in a fiber or other product are determined from X-ray diffractometer scans of powder samples. The semiquantitative analyses are derived from the comparison of peak intensities of the scan from the sample to peak intensities of suitably prepared standards (cf. "X-Ray Diffraction" by H. P. Klug and L. E. Alexander, published by John Wiley & Sons, Inc., New York, 1954, pp. 410–439).

The quantitative crystallinity results herein are based on the direct comparison of sample diffractometer scans to standards, using a Philips' X-ray diffractometer in the reflection mode with Cu-K$_\alpha$ radiation, as follows: $\alpha$-cordierite content is the average of analyses calculated from the 8.48A and 3.14A peaks; cristobalite is calculated from the 4.05–4.10A peak after subtracting the intensity due to $\alpha$-cordierite (0.377 × 8.48A intensity); mullite content is the average of analyses calculated from the 5.39 and 2.69A peaks. The results have a precision of ±15%.

The microstructural features of the articles of this invention, such as yarn porosity, size of sintered yarn, component distribution, and void size and distribution are determined microscopically. Polished cross and longitudinal sections of the tube wall are viewed via reflected light microscopy and/or scanning electron microscopy. Fractured yarn ends are also viewed via scanning electron microscopy. Yarn porosity is determined microscopically using cross or longitudinal sections and any of the standard analytical procedures (e.g., lineal analysis, point counting), as generally described in "Ceramic Microstructure", edited by Fulrath and Pask, published by John Wiley and Sons, Inc., New York 1968, especially pp. 25–53 and 187–207. Yarn porosity values for the examples were determined by lineal analyses of photomicrographs of cross sections. Void and yarn dimensions are measured directly from microscopic examinations of cross and longitudinal views with magnifications suitably taken into account. The amount of coating and amount of fused areas within a yarn are determined by microscopic analytical techniques again using, e.g., lineal analysis, point counting or areal analysis. Nondispersive X-ray spectrometry in the Scanning Electron Microscope assists in differentiating one component from another (e.g., the reaction interface) by defining elemental profiles.

The percentage of refractory oxide present in the yarn component of the structures are determined by Electron Microprobe Analysis. A section of the structure, prepared for microscopic examination by embedding and polishing, is examined in an electron microprobe. The quantitative analyses for the refractory oxides, usually $Al_2O_3$ and/or MgO, are performed using standard microprobe techniques of pulse accumulation and comparison to standards, as described in *Electron Beam Microanalysis*, D. R. Beaman and J. A. Isasi, ASTM Special Technical Publication 506, American Society for Testing and Materials, Phila., 1972.

The creep failure is a measure of the high temperature load bearing properties of the structures. The structures are placed upright with a weight equivalent to a force of 4 to 10 pounds/square inch of tube cross-sectional wall area in an oven at about 600°C. The temperature is slowly raised with 0.5 hour holding periods at about 100°C. intervals beyond 1000°C. until the structure obviously bulges, buckles, sags or ruptures. The temperature (°C.) at which this happens is termed the "creep failure temperature". As seen from Table I, resistance to creep failure increases as the degree of crystallinity present in the fibers of the structures increases.

Compressive strength of the structures is determined by crushing the structure at room temperature (if a tube, it is crushed along its longitudinal axis) between two flat steel plates moving at a rate of 0.10 inch/minute on an Instron instrument. The compressive strength is reported as the breaking force in pounds (lbs.) and in pounds/square inch (psi) obtained by dividing the breaking force by the cross-sectional area of the tube wall.

The pressure drop is a measure of the resistance of the structure to gas flow. It is expressed as the pressure drop ($\Delta P$) in inches of water and is determined by passing ambient air at 150 cubic feet/minute through the walls of the structure and measuring the pressure. The base of the tube is held against an airtight flange at the end of a duct and the top of the tube is sealed with a plate.

The wall density (a bulk density) is calculated from the weight of the structure and its total volume. The bulk densities of the products of the invention range from about 0.5 to 1.5 g./cm.$^3$. The densities of the solid components of the products of the invention range from 2.5 to 3.2 g./cm.$^3$.

The Ignition Interrupt test is run on a 350 C.I.D. engine stand utilizing one-half of the exhaust. The engine is stabilized at about 800°C. temperature input to the cartridge (i.e., a tube coated with Pt catalyst mounted in a reactor as shown in FIG. 5), located right after the exhaust manifold, with engine RPM at 2500. The load is removed from the engine and wide open throttle is applied up to 3000 RPM. At this point, the ignition is cut and the engine motors down (called dieseling) for about 10 seconds. Numerous backfires occur during the motoring. This sequence is repeated 10 times to insure that samples are adequately exposed to the surges of unburned fuel and pressure pulses (shock waves from backfiring). Temperatures at the exit end have been measured in excess of 1260°C., but the response of the temperature measuring device is not fast enough to measure the actual higher temperatures developed, which are believed to exceed 1450°C.

The thermal shock resistance of the products is determined by placing a cold product in an oven at 950°C., heating for 5 minutes, removing from the oven and cooling in room temperature air for 5 minutes. This cycle is continued 4 additional times and the compressive strength measured. After each cycle, the product is inspected visually using a 5× glass. A product is considered to fail in thermal shock when sufficient cracks are observed in localized regions to constitute crack formation and propagation. Under this definition, failure occurs when several adjacent yarns crack to form a continuous crack of ~one-fourth inch in length or more, or when several individual yarn breaks are observed within a localized region, e.g., a cluster of breaks that are not necessarily aligned to form a propagating crack but are also not random by virtue of their density (12/in.$^2$). Individual yarn breaks sparsely distributed around the unit do not constitute thermal shock failure. It should be noted that it is a qualitative measure of high quality and that many units that "fail" are still strong durable units as shown in the examples.

It is believed that the excellent thermal shock resistance of the products of this invention is due in part to the presence of the glass-ceramic phase as single or partially sintered fibers rather than as a totally fused monolithic structure and also in part to the lowered cristobalite content due to the reaction interface. Both of these factors are promoted by uniform distribution and good penetration of a suitable coating composition into the glass fiber yarn.

All percentages given herein are on a weight basis unless stated otherwise.

EXAMPLE 1

Twelve ends of yarn of continuous filament S-glass are plied and twisted (less than 1 turn/inch) to give a total yarn denier of about 3650. This yarn is dipped into a coating composition containing 25 parts water glass ($Na_2SiO_3$) solution of 40°–42° Baume (about 40% solids), 100 parts of water and 100 parts of finely divided alpha alumina having no particles larger than 2 microns (A-16 SG, about 99.7% $Al_2O_3$, marketed by Aluminum Co. of America). The coated yarn is wound helically on a 2.1-inch O.D. core in a crisscross fashion using a wind angle $\theta$ 39° and a diagonal A of 0.23 inch. The yarn is wound in helical convolultions spaced apart at a distance of about 3 mm. The core consists of an inner stainless steel tube wrapped with several layers of a paper towel and covered with heavy aluminum foil. The wound tubes are dried at 150°C., the stainless steel core removed, and the tubes heated at 550°C. for 5 to 60 minutes to burn off any paper.

The aluminum foil is then removed, and the remaining tube of crystallizable glass fiber yarn is placed in an oven at a temperature of no more than 600°C.

Five such samples, labeled A, b, C, D and E were heated and fired in the manner described in Table I following, and were treated for their crystallinity and their creep failure with the results shown in Table I.

Samples A, B, D and E were heated to the maximum temperature over a 6–8 hour period at a steady rate. Sample C was heated to 900°C., cooled to room temperature, then slowly heated to 1280°C. over a 6–8 hour period at a steady rate. All samples were cooled to below 600°C. over a 16 hour period.

The qualitative estimate of crystallinity was based on examination of film X-ray diffraction pattern for the interplanar spacing of 8.5A for alpha cordierite. The semiquantitative analyses were based on X-ray diffractometer scans which showed alpha alumina for all samples and mullite in the range of 5–12% for samples C, D and E. Based on the analyses and the original glass content, it is calculated that the glass fibers originally in samples C, D and E were crystallized 65%, 99% and 72%, respectively.

TABLE I

| Sample | Maximum Temp. reached | Time at Maximum Temp. | Crystallinity | Crystalline Phases* %C | %CR | Creep Failure Temp. °C. |
|---|---|---|---|---|---|---|
| A | 900°C. | 1 hr. | None | 0 | 0 | 880 |
| B | 1030°C. | 1 hr. | None | 0 | 0 | 1130 |
| C | 1280°C. | 1 hr. | Some | 24 | 27 | 1230 |
| D | 1400°C. | 1 hr. | Very Crystalline | 63 | 15 | 1400 |
| E | 1280°C. | 48 hrs. | Very Crystalline | 42 | 14 | |

*C, α-cordierite; CR, cristobalite

The finished articles, about 2.75 inches O.D., 2.2 inches I.D. and 6.6 inches long, weigh approximately 300 gms. and all contain about 20% by weight of ceramic coating except item D which has about 18% based on material balance.

It is seen from Table I that the degree of crystallinity of samples A–E increases as the maximum temperature increases, and also increases as the time held at maximum temperature is lengthened (compare samples C and E).

Items A, B and C have compressive strengths in the range of 147 to about 390 pounds, i.e., 69 psi. to 182 psi.

Stereoscan electron micrographs of fractured tubes show that the walls of items B–E contain partially sintered fibers while the wall of item A contains essentially unsintered (separate) fibers.

EXAMPLE 2

Results similar to those in Example 1 are obtained with the following coating composition:
  350 parts of a 60% dispersion of alumina of Example 1 in water
  292 parts aluminum chlorohydroxide [$Al_2(OH)hd 5Cl.2H_2O$]
  221 parts water
  7.9 parts $AlCl_3.6H_2O$
  4.4 parts $MgCl_2.6H_2O$
  8.1 parts concentrated hydrochloric acid An integral, refractory tube made using the procedure for sample D of Example 1 has the following characterizations:
  porosity of yarn — about 55%;
  channels between segments of partially sintered glass-ceramic fibers have an average length to width ratio of about 8:1 with a range of from 1:1 to 30:1;
  the tube has a wall density of about 80 lbs./ft.$^3$ (1.28 g. cm.$^3$);
  the yarns have an average ratio of about 5:1 for maximum/minimum dimensions in cross sections perpendicular to the length of the yarn with a range of about 2:1 to 7:1; and
  X-ray analysis of the tube shows the presence of alpha cordierite (65%), cristobalite (19%) and mullite (13%), indicating the presence of a reaction interface, in addition to alpha alumina; based on the original glass content (82%), it is calculated that the glass-ceramic fibers contain 99+% of stable crystalline phases.

EXAMPLE 3

The general procedure used to make item C of Example 1 is repeated except that the tube is heated at 1280°C. for 48 hours before slow cooling to 650°L. and removal from the oven. The product is strong and has a pressure drop of about 11 inches of water. The final tube is 6⅝ inches long, weighs 392 grams, and has an inside diameter (I.D.) of 2⅛ inches and an outside diameter of 3 inches. Its cut ends (0.75 inch) are coated with a commercial high temperature bonding and coating cement ("Cera-Kote" cement made by Johns Mandville Co. of Denver, Co.) and dried at 150°C. The tube is soaked in platinum resinate solution solution No. A-1121, 12% Pt (made by Engelhard Industries) and fired at 400°C. for 30 minutes to leave a final platinum catalyst coating of 1.25 grams.

The integral, refractory tube is then placed in a reactor as shown in FIG. 5 which is fitted into the air pump assisted exhaust system of a 1971 Mercury auto. It converts 94% of the CO and 64L% of the hydrocarbons in the exhaust when the auto is run on a Dynamometer at a rate equivalent to 20 miles/hour on a road. The tube retained its integrity and strength for 52,000 miles of road driving. The tube has a yarn porosity of 26%.

EXAMPLE 4

Six ends of 600 denier yarn of continuous filament S-glass (filament diameter of 11–12 microns) are plied and twisted (1.0 Z-twists/inch) to give a yarn containing about 2448 filaments and a total denier of 3600. The yarn is passed through a coating composition and wound helically at 75 feet/minute on a core in a crisscross fashion using a wind angle $\theta$ of 27° and a diagonal A of 0.14 inch. The core with a diameter of about 1.8 inches consists of a stainless steel tube covered with a layer of a paper towel and an overlapping layer of heavy aluminum foil (5 mil.). The tube is heated with hot air from a head gun for partial drying as it is wound. The winding is continued for about 12 to 15 minutes. The tube of yarn and aluminum liner are removed from the steel core, dried in a 150°C. oven for 30 minutes and the aluminum liner removed. If the tube contains all the coating compositon that is desired, it is heated to 1400°C. and cooled in a tunnel kiln using a 15-hour cycle. The heating cycle (approximately) is from 100°C. to 700°C. in 3.75 hours, then to 1200°C. in 1.25 hours and held for 1.25 hours, to 1400°C. in 0.5 hour where it is held for 0.75 hour and then cooled to 100°C. in 7.5 hours.

When additional coating composition is desired, instead of heating to 1400°C., the dried tube is heated to 600° to 700°C. in a furnace in about 2 hours and held 1 hour at that temperature and then cooled in the furnace with the door open and the power off. The cooled tubes are dipped in the coating composition, drained and dried at 150°C. This sequence of low firing, dipping and drying is repeated until the desired amount of coating composition has been acquired. The tube is then fired to 1400°C. as described above.

The above procedure is followed using the coating compositions given in Table II with the parts by weight of each component given. The letter A designates the alpha alumina particles of Example 1. This is used as a well dispersed aqueous slurry. The compositions are prepared to form a good dispersion of any insoluble material. For example, the compositions of items $c$ and $f$ are ball milled overnight. The spinel particles range from 1 to 5 $\mu$ in diameter. A methyl cellulose thickener (Methocel 90 HG made by Dow Chemical Co. of Midland, Mich.) is used for item $f$.

The ceramic formed from each component in the coating composition after heating is shown under "Ceramic Coating - Type" in Table II. It will be understood that compounds may be formed of two or more different oxides present.

The amount of ceramic coating in the final fired tube obtained from application of the coating composition to the yarn before winding the tube (i.e., "on line application") is expressed as a percentage of the final tube weight under column $a$ of Table II. Column $b$ gives the amount of additional ceramic coating obtained in one or more post-winding applications. Items $d$ and $e$ are made with only one post-winding application while items g and h use two. Column c is the total coating applied to the yarn and tube.

The above ceramic-coating values are the average of two samples except for a single item d.

The completely fired tubes have average weights ranging up to 223 g. (item d). The lengths are 3.0 ±0.1 inches; the outside diameters are 2.8 ± 0.1 inches and the inside diameters are 1.8 ± 0.1 inches.

Properties of the final tubes are given in Table III. The pressure drop (ΔP) and wall density (calculated from dimensions and weight) are the averages of two samples.

Under the heading "Crystalline Phases" in Table III are the analyses for α-cordierite (C), cristobalite (CR) and other phases found such as α-alumina (A), mullite (M), spinal (S), Zirconia (Z) and Zircon (ZI). The analyses for mullite range from 10 to 25% and indicate the presence of a reaction interface.

The analyses indicate that the glass fibers in items a–f have been crystallized to an extent of 99+% while items g and h show glass crystallization of 82 and 57%, respectively. In view of the low cristobalite content of item h in conjunction with the presence of zircon ($ZrO_2.SiO_2$), presumably at the interface, the glass was crystallized at least 60%.

The high cordierite content of items e and f is believed to be due to the reaction of silica from the fiber with MgO and alumina or spinel $MgO.Al_2O_3$) at the fiber interface.

Item e has a creep failure temperature (6.6 psi loading) of over 1440°C.

The walls of all products contain partially sintered fibers with no more than 20 to 30% of the fibers being located in fused areas.

Items c, e, f have yarn porosities of 26, 26, and 27%, respectively.

EXAMPLES 5 and 6

A 3600 denier yarn with 1.0 Z turns/inch of continuous filament S-glass impregnated with a coating composition is used to wind at 150 feet/minute tubes on 1.75 inch O.D. cardboard tubes on winder cores. The coating composition is prepared by mixing the following ingredients in the order given:

360 parts of a 50% aqueous solution of $Al_2(OH)_5Cl.2H_2O$
2.75 parts $MgCl_2.6H_2O$
11.0 parts concentrated hydrochloric acid (ca. 37% HCl)
130.0 parts of alpha alumina particles with a median particle size of about 0.5 micron.

The mixture is stirred for 6 to 12 hours to dissolve the soluble ingredients and then treated for 4 hours in a Sweco Vibro-Energy Wet Grinding Mill (model M45L by Sweco Co., Los Angeles, Calif.) to obtain a good dispersion and break up aggregates of alumina (98% of particles no larger than 2 microns). This dispersion, with a viscosity of about 120 centipoises at 30°C., is diluted with a small amount of water to a viscosity of 65 to 85 centipoises at ca. 26°C.

The yarn is passed in contact with a groove in a roller that dips into the coating composition. Each yarn tube is heated by a radiant lamp or hot air as it is wound to assist in drying. The yarn tubes are dried at 100° to 150°C. for 2 hours and then heated at a steady rate from 25° to 600°C. in about 2–3 hours and held at 600°C. for 45 minutes. The fired tubes are dipped in a bath of the above coating composition diluted to give a viscosity of 60 centipoises at ca. 26°C. and the tubes dried. The tubes are then heated and cooled in a tunnel kiln using a 10-hour cycle with a 1400°C. maximum temperature with the following approximate profile:

25° to 600°C. in 2.5 hours, 600° to 1200°C. in 0.75 hour and held at 1200°C. for 0.75 hour, 1200° to 1400°C. in

TABLE II

| | COATING COMPOSITION (parts by weight) | CERAMIC COATING | | | |
|---|---|---|---|---|---|
| | | Type | % of Final Weight | | |
| | | | a | b | c |
| a | A(60), con. HCl(0.48), water(40) | $Al_2O_3$ | 39 | 0 | 39 |
| b | eta alumina(975), con. HCl(10), water(800) | $Al_2O_3$ | 32 | 0 | 32 |
| c | gamma alumina(680), water(720), glacial acetic acid to pH 5 | $Al_2O_3$ | 35 | 0 | 35 |
| d | A(590), $AlCl_3.6H_2O$(940), water(810) | $Al_2O_3$ | 18 | 17 | 35 |
| e | A(248), $Mg(C_2H_3O_2)_2.4H_2O$(520), water(592) | $Al_2O_3/MgO$ 1:1* | — | — | 34 |
| f | Spinel(300), $Al(NO_3)_3.9H_2O$(220), water(825), thickener(3) | $(MgO.Al_2O_3)/Al_2O_3$ 7.2:1* | 27 | 0 | 27 |
| g | $Al_2(OH)_5Cl.2H_2O$(50), water(50) | $Al_2O_3$ | 5 | 18 | 23 |
| h | Zirconium acetate, $ZrO_2$, water | $ZrO_2$ | — | — | 42 |

*mol ratio

TABLE III

| | COMPRESSIVE STRENGTH | | THERMAL SHOCK | ΔP | WALL DENSITY | CRYSTALLINE PHASES |
|---|---|---|---|---|---|---|
| | as-fired lbs. | psi. | after thermal shock, psi. | cycles to failure | inches water | g./cm.³ | %C-%CR-Other |
| a | 337 | 79 | 84 | — | 9 | 0.99 | 47-18-M-A |
| b | 155 | 40 | 42 | 5 | 13 | 0.88 | 65-15-M-A |
| c | 375 | 106 | 28 | >5 | 23 | 0.93 | 56-7-M-A |
| d | 674 | 187 | 75 | >5 | 55 | 1.17 | 63-14-M-A |
| e | 362 | 103 | 127 | >5 | 18 | 0.92 | 84-5-A-S |
| f | 620 | 187 | 31 | >5 | 35 | 0.91 | 71-15-S |
| g | 191 | 50 | 69 | 5 | 16 | 1.01 | 45-12-M-A |
| h | 1070 | 299 | — | 2 | | 1.24 | 32-1-Z-ZI |

0.40 hour at 1400°C. for 0.6 hour and from 1400 to ca. 100°C. in 5 hours (equivalent to a pyrometric cone of between 14 and 15). Further specifics of the preparations are reported in Table IV.

Under "ceramic coating", Table IV, columns a and b give the amount of ceramic coating (fired) as the percentage of the final weight of the tube derived from the pre-winding application and post-winding application(s) of coating compound, respectively. Column c gives the final amount of ceramic coating as a percentage of the total weight of the final tube. The remaining tabulations are obtained from the final fired tubes.

The product of Example 5 has a nominal wall volume of 25 cubic inches and a yarn porosity of 15%. The wall contains partially sintered fibers with about 10–20% of the fibers being in several fused areas. The product has a creep failure temperature greater than 1440°C. under a load of about 4.5 psi.

A tube made as above in Example 5 is given an additional dip in the coating composition, dried and heated to 900°C. in 3–4 hours and held there for 0.5 hour. This final tube contains 25, 11 and 11% ceramic coating derived from pre-winding, post-winding and post high fire applications, respectively. Catalyst (1.5 grams of Pt) is applied to the tube by dipping in a solution of platinum resinate diluted with toluene. This catalyst-containing tube survives 10 cycles of the Ignition Interrupt Test with only the development of a hairline crack.

Another product is made as in Example 5 with the exception that the final firing is to a maximum of 1440°C. with a 10-hour heating and cooling cycle in a tunnel kiln. The product weighing 512 grams and containing 50% of ceramic coating (based on total weight) is coated with platinum catalyst as descried above. It survives 10 cycles of the Ignition Interrupt Test with no signs of damage.

The product of Example 6 has a nominal wall volume of 60 cubic inches and a yarn porosity of 20%. About 97% of the fibers are present as partially sintered fiers with the other fibers present in one fused area of the cross section.

A product made with the procedure of Example 6 but with an 8.5-hour kiln cycle to 1400° and containing 43% of ceramic coating is given an additional application of ceramic coating (9% of final tube weight) and fired to 900°C. This unit survives 10 cycles of the Ignition Interrupt Test without any damage. Similar results to Example 6 are obtained using an alternative coating composition containing 58% alpha alumina particles, 11% alpha trihydrate of alumina, 0.5% concentrated hydrochloric acid and 31% water in only a pre-winding application to yield a finished article containing about 40% ceramic coating.

Another product like that of Example 6 but heated to 1440°C. showed only 7% cristobalite content and had a yarn porosity of 30%.

EXAMPLE 7

A 1200 denier yarn of continuous filament S-glass is prepared by plying two ends of 600 denier yarn and bulking the yarn by passing it through a Taslan air jet of the type shown in U.S. Pat. No. 3,545,057 at a speed of 150 yards/minute with about 1.5% overfeed and using an air pressure of 50 psi.

The yarn is impregnated with a coating composition (60 centipoise) similar to that of Example 5 by passing between a finish roll and a spring-loaded squeeze roll and is helically wound at 75 feet/minute onto a cardboard tube using the general procedure of Example 5. Coating composition is applied to the tube after the 600° firing, the tube dried and then fired to 1440°C. and cooled in a 10 hour tunnel kiln cycle. Other details and properties are given in Tables IV and V, respectively.

A unit made like the above but wound up for a longer time to give a fired weight of 924 g., and O.D. of 4.2 inches and a total ceramic coating content of 73% of the tube final weight is coated with platinum catalyst as in Example 5. This unit survives 10 cycles of the Ignition Inteerrupt Test with no damage.

An otherwise similar unit containing only 65% (of total weight) of ceramic coating shows no cracks after 5 cycles of thermal shock.

Cross sections of the product show fibers sintered in groups of 5 or 10 fibers.

EXAMPLE 8

Continuous glass fibers (average diameter about 10 microns) containing 61% $SiO_2$, 20% $Al_2O_3$, 15% MgO, 2.5% $B_2O_3$ and 1.5% $Na_2O$ in the form of a 6000 denier yarn are used with the coating composition of Example 5 to make fluid permeable tubes using the general procedure of Example 4.

The tubes receive a final heating to 1400°C. using the 10 hour kiln cycle of Example 5. Further process details are given in Table IV. Properties of the product are given in Table V.

Scanning electron microscope examination of a fractured wall shows that about 80% of the fibers are present as sintered fibers, predominantly in groups of about 10 fibers) separated by pores. About 20% of the fibers are present in fused areas.

Table IV

| Example | Ceramic Coating % of final weight | | | Θ | Diagonal A inches | weight grams | length in. | O.D. in. | I.D. in. |
| | a | b | c | | | | | | |
|---|---|---|---|---|---|---|---|---|---|
| 5 | 28 | 15 | 43 | 27 | 0.14 | 472 | 6.0 | 2.9 | 1.7 |
| 6 | 29 | 11 | 40 | 27 | 0.14 | 1211 | 5.8 | 4.0 | 1.7 |
| 7 | 43 | 25 | 68 | 34.8 | 0.14 | 504 | 5.9 | 3.3 | 1.8 |
| 8 | 34 | 15 | 49 | 21 | 0.21 | 223 | 3.1 | 2.9 | 1.8 |

TABLE V

| Example | STRENGTH | | | THERMAL SHOCK cycle to failure | Δ P inches water | WALL DENSITY g./cm.$^3$ | CRYSTALLINE PHASES* %C-%CR-OTHERS |
| | as-fired lbs. | psi. | after shock psi. | | | | |
|---|---|---|---|---|---|---|---|
| 5 | 912 | 207 | 206 | >5 | 13 | 1.12 | 52-11-M-A |

TABLE V-continued

| Example | STRENGTH as-fired lbs. | STRENGTH as-fired psi. | STRENGTH after shock psi. | THERMAL SHOCK cycle to failure | ΔP inches water | WALL DENSITY g./cm.³ | CRYSTALLINE PHASES* %C-%CR-OTHERS |
|---|---|---|---|---|---|---|---|
| 6 | | | 171 | >5 | 20 | 1.23 | 47-12-M-A |
| 7 | 400 | 68 | | | 16 | 0.88 | 25-o-M-A |
| 8 | 190 | 48 | 147 | >5 | 55 | 1.11 | 58-7-M-A |

*C, α-cordierite; CR, cristobalite; A, α-alumina; M, mullite (20–33% range) original fiber crystallized 99+% for examples 5, 6 and 7; 74% for Example 8.

EXAMPLE 9

This is a comparative example using yarn of noncrystallizable glass fibers, E-glass. Tubes (a) are wound with a yarn of E-glass fibers bearing the coating composition of Example 5. After drying and heating at 700°C. for 3 hours, additional coating composition is applied to one tube (b). The tubes are placed upright in a cool oven which is then heated at a steady rate to 1250°C. and then cooled. Tube (a) containing 32% ceramic coating (alumina) sags during the heating. Tube (b) [46% coating] survives the oven heating but has a creep failure temperature of 1200°C. under 5 psi loading.

The properties of the structure disclosed herein which make it an outstanding candidate for use in automotive exhaust systems are also useful in chemical processing such as in the conversion of coal to liquid or gas fuels, ammoxidation of propylene for acrylonitrile and refinement of crude oil. The structures are also useful in industrial fume abatement devices or sewage treatment reactions such as oxidation of ammonia. Other utilities and various changes and modifications leading to equivalent structures and processes will occur to those skilled in the art without departing from the spirit of the invention which is accordingly intended to be limited only by the scope of the appended claims.

Having thus described the invention, what is claimed as new and desired to be secured by Letters Patent is:

1. A fluid permeable, refractory structure containing no more than 30% cristobalite and comprising:
    A. a plurality of layers of porous yarn, each layer having the yarn within it in spaced apart, substantially parallel rows, each layer being arranged in relationship with the neighboring layers such that a plurality of about diamond shaped apertures is defined by the criss-crossing of yarn in the neighboring layers, and each layer in the structure arranged such that the about diamond shaped apertures extend through the structure;
    said yarn consisting essentially of siliceous glass-ceramic fibers that are partially sintered and containing at least 60% of stable crystalline phases and comprising between about 20% and 85% of the structure, by weight and having a porosity of 10–70% and
    B. from about 15% to about 80% of the structure, by weight, of a ceramic coating of a polycrystalline oxide or oxide compound or mixtures thereof which is affixed and positioned to at least partially surround the fibers but which does not close the diamond shaped apertures; the crystalline phases and ceramic coating having melting points of at least 1400°C.

2. The structure of claim 1 in the form of a tube.

3. The structure of claim 2, wherein the creep failure temperature is greater than 1200°C.

4. The structure of claim 3, wherein said yarn is comprised of siliceous glass-ceramic fibers having a diameter of from about 5 to 50 microns and said coating is comprised of at least one refractory oxide and there is a reaction interface between the fibers and coating comprised of at least one polycrystalline refractory silicate.

5. The structure of claim 4, wherein said coating is comprised of alumina and said interface is mullite.

6. The structure of claim 4, wherein said fibers are comprised of α-cordierite.

7. The article of claim 13, wherein said fibers contain at least 40% by weight of silica, said coating is comprised of at least one refractory oxide and there is a reaction interface between the fibers and coating comprised of at last one polycrystalline refractory silicate.

8. The article of claim 7, further characterized by a creep failure temperature of at least 1400°C.

9. The structure of claim 1 wherein at least 40% by weight of the ceramic coating is alumina.

10. The structure of claim 1 wherein the partially sintered yarn contains closely spaced voids having from 1 to 50 μ equivalent diameter, the distances between neighboring voids eing typically less than 10% of the yarn thickness.

11. The structure of claim 1 having a compressive strength of at least 30 psi, a creep failure temperature above 1200°C. at a pressure of at least 4 psi and a pressure drop of between 1 and 100 inches of water at a flow rate of ambient air of 150 ft.³/min.

12. The structure of claim 1 wherein the glass-ceramic fibers contain at least 30% by weight of a refractory oxide in addition to $SiO_2$.

13. As an article of manufacture, a rigid, self-supporting porous, refractory tube containing no more than 30% cristobalite, adapted to support a catalyst and characterized by a creep failure temperature above 1200°C., said tube comprising:
    yarn arranged in crisscrossed layer of spaced, helical convolutions presenting multiple rows of apertures extending therethrough,
    said yarn being comprised of partially sintered, siliceous, glass-ceramic fibers containing at least 60% of stable crystalline phases bearing a ceramic coating of a polycrystalline oxide or oxide compound or mixtures thereof and wherein the yarn has a porosity of 10–70%.

* * * * *